United States Patent Office 3,840,675
Patented Oct. 8, 1974

3,840,675
POPCORN-LIKE FLAVORANT AND PROCESS FOR PREPARING THE SAME
Thomas H. Parliment, New City, N.Y., assignor to General Foods Corporation, White Plains, N.Y.
No Drawing. Filed Jan. 2, 1973, Ser. No. 320,423
Int. Cl. A23l 1/26
U.S. Cl. 426—65         10 Claims

ABSTRACT OF THE DISCLOSURE

A substance having a taste and aroma virtually indistinguishable from that of freshly-popped popcorn is produced by reacting a compound selected from the group consisting of glyoxal, glycolaldehyde and combinations thereof, with a sulfide source at elevated temperatures. The reaction is preferably carried out in the presence of water at relatively high pH. After cooling, the reaction mixture is acidified and aged, and a characteristic, pleasant popcorn flavor and aroma develops.

BACKGROUND OF THE INVENTION

This invention relates to the production of new synthetic flavoring agents and, more particularly, to the production of a substance having the flavor and aroma of freshly popped popcorn.

It has long been considered desirable to provide an effective and economical substance which could be used to impart not only the flavor but also the aroma of freshly-popped popcorn to a wide variety of food products such as potato or corn chips, puffed products, crackers and the like; cereals and processed cereals such as corn, wheat, rice and soy; vegetables and processed vegetables such as corn, carrots, potatoes, frozen corn and dehydrated potatoes, seasonings such as imitation butter flavor and table salts; candies; and various dairy products such as cheese.

In spite of this apparently large potential market for such a substance, I am unaware of any practical method for obtaining natural extracts at low cost which would provide the desired fresh-popped flavor and aroma. In an article by J. P. Walrodt et al. (J. Agr. Food Chem., vol. 18, No. 5, 1970, page 926) the extraction and identification of the volatile components of popcorn is discussed. However, the authors do not propose any economical means for obtaining an extract in sufficient quantities or at sufficiently low cost as to make it economically practical. Moreover, it is often found that natural extracts are relatively unstable, lack potency and spoil within short periods of time unless special precautions are taken.

The demand for artificial flavoring agents of various kinds has dramatically increased in recent years due, at least in part, to consumer demand for a wide variety of convenience and snack foods as well as insistence upon consistency and stability in food products. Additionally, there is a practical shortage of natural flavorants. While the art of producing artificial flavorants has, in general and to a limited degree, progressed with an increased demand, no truly economical artificial popcorn flavorants have been produced. For example, in U.S. Pat. No. 2,934,436, C. G. May et al. disclose reacting an amino reagent comprising cysteine or cystine with glyceraldehyde to obtain flavoring substances exhibiting the taste or smell of foodstuffs such as meat. However, no popcorn flavorant is produced. In U.S. Pat. No. 2,594,379, W. E. Barch discloses producing flavorants by reacting certain aldehydes or ketones, dissolved in an aliphatic ester of a hydroxy polybasic acid, with $H_2S$. Again, however, no popcorn flavorant is produced. Likewise, U.S. Pat. No. 3,650,771 to C. Wiener discloses the preparation of flavors of onion and bacon by reacting certain sulfide and hydrosulfide compounds with certain aldehydes, but fails to provide any suggestion for the preparation of a popcorn flavorant. And, while H. W. Brinkman et al. in U.S. Pat. No. 3,653,-920, disclose the production of meat flavors by reacting a compound of the formula $R_1$—SH with a compound of the formula $R_2$—CHO in the presence of water and $H_2S$ or an alkali metal or alkaline earth metal sulfide, at a pH of from about 3 to 8 where $R_1$ and $R_2$ are either methyl or ethyl groups, this reference likewise provides no guidance in the production of popcorn flavorants.

I note that D. L. Roberts, in U.S. Pat. No. 3,402,051, proposes the production of 2-acetyl-pyrazine and its derivatives to impart a popcorn-like flavor to foods and tobacco. These compounds are, however, relatively expensive and it would be desirable to have an alternative product having the flavor and aroma of freshly popped popcorn.

BRIEF SUMMARY OF THE INVENTION

Accordingly, it is an object of the present invention to provide a new flavorant having the flavor and aroma of popcorn.

It is a further object of the present invention to provide a new method for preparing a flavorant having the flavor and aroma of popcorn.

It is a further object of the present invention to provide a simple and economical method for producing a flavorant having the flavor and aroma of popcorn which is stable for long periods of time.

These and other objects are accomplished by the present invention which provides a flavorant having a taste and aroma virtually indistinguishable from that of freshly-popped popcorn which is produced by reacting a compound selected from the group consisting of glyoxal, glycolaldehyde and combinations thereof, with a sulfide source at elevated temperatures. The reaction is preferably carried out in the presence of water at a relatively high pH. After cooling, the reaction mixture is acidified and aged, whereby a characteristic, pleasant popcorn flavor and aroma develops.

DETAILED DESCRIPTION OF THE INVENTION

A principal feature of the present invention resides in the discovery that a narrow class of reactants can be brought together according to a precise process to achieve a new and highly desirable material having the flavor and aroma of popcorn. The glyoxal, represented by the structural formula

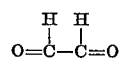

and the glycolaldehyde represented by the structural formula

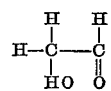

which are employed in the present invention are well-known, commercially-available materials and can be prepared according to procedures well known in the art.

Although simple, readily available inorganic sulfides are preferred as the sulfide source according to the present invention, any compound which releases $S^=$ or $HS^-$ ions at reaction conditions and does not impair the quality of the final product may be employed. For example, organosulfur compounds may be employed providing they release sulfide under the reaction conditions. However, since the inherent potency of any unreacted organosulfur compound may overpower the delicate popcorn character, these compounds are not considered preferable sources of sulfide. Exemplary of the inorganic sulfides which may be employed according to the present invention are hydrogen sulfide; alkali metal sulfides and hydrosulfides such as sodium sulfide, potassium sulfide, sodium hydrosulfide and potassium hydrosulfides; ammonium sulfide; and alkaline earth metal sulfides and hydrosulfides such as calcium sulfide and calcium hydrosulfide. Ammonium sulfide is particularly preferred.

The reaction is generally carried out in a hydroxylated solvent such as water alone or in combination with another solvent. The solvent is preferably present in an amount ranging from about 0.1 to 100 times the total weight of the reactants with about 10 times the total weight being particularly preferred.

The glyoxal, the glycolaldehyde or a combination of the two, is preferably added in an equal molar amount relative to the sulfide source. However, the molar ratio of the glyoxal or the glycolaldehyde to the sulfide may be from amout 1:10 to 10:1.

According to the method of the present invention, the reactants, e.g. the glyoxal or glycolaldehyde and the sulfide source, are admixed with solvent and the reaction mixture is preferably brought to a relatively high pH by adding a sufficient amount of a suitable base such as sodium hydroxide. The exact order of adding these reactants and the base is not presently believed to be critical. The reaction is preferably carried out at a pH of above about 7 and desirably close to 12. However, tests have established that the reaction can be carried out at a pH value as low as 3 with somewhat diminished results. The reaction mixture is then heated to an elevated temperature, with the boiling point of the reaction mixture at atmospheric pressure being preferred. Higher temperatures may be employed but necessitate the use of pressure equipment, whereas lower temperatures may also be employed but require extended periods of heating.

The reaction is generally completed within about 10 minutes to about 2 hours. Preferred reaction times range from about 15 to 30 minutes. A change in the color of the reaction mixture from light to dark brown generally indicates completion of the reaction. After completion of the reaction, the reaction mixture is acidified with a sufficient amount of a suitable acid such as HCl and agitated to expel excess $H_2S$. The pH is preferably brought to below 7, and most preferably to about 3. After acidification, the reaction mixture is allowed to age for from at least about ½ to 2 days during which time the reaction product develops the desired flavor and aroma of popcorn. Longer aging periods can be employed if desired.

The following examples are presented for the purpose of further illustrating, explaining, and comparing the present invention and are not to be taken as limiting in any sense. Unless otherwise indicated, all parts and percentages are by weight.

EXAMPLE 1

This example illustrates a preferred method according to the present invention. A reaction mixture is prepared by combining 9 ml. of water, 0.1 gm. of glycolaldehyde and 1 ml. of a 20% aqueous solution of ammonium sulfide in a wide mouth jar. Sufficient concentrated NaOH is added to the reaction mixture to raise the pH to 12.5. The reaction mixture is then heated at 100° C. for 60 minutes. After cooling, sufficient concentrated HCl is added to the reaction mixture to reduce the pH to 3. The acidified reaction mixture is stirred at room temperature to expel excess $H_2S$ and allowed to age for 2 days. After aging, the reaction mixture was found to possess a nice, freshly-popped popcorn aroma and taste.

EXAMPLE 2

This example illustrates another preferred method according to the present invention. A reaction mixture is prepared by combining 10 ml. of water, 0.2 ml. of a 40% aqueous solution of glyoxal and 1.0 ml. of a 20% aqueous solution of ammonium sulfide in a wide mouth jar. Sufficient concentrated NaOH is added to the reaction mixture to raise the pH to 12. The reaction mixture is then heated at 100° C. for 30 minutes. After cooling, sufficient concentrated HCl is added to the reaction mixture to reduce the pH to 3. The acidified reaction mixture is stirred at room temperature to expel excess $H_2S$ and allowed to age for two days. After aging, the reaction mixture was found to possess a nice, charred popcorn aroma and taste.

EXAMPLE 3

This example illustrates the effect of pH and the sulfide reactant on the final popcorn flavor. In each of the 9 experiments listed below in Table 1, a reaction mixture was prepared by combining 0.5 ml. of a 40% aqueous solution of glyoxal, 10 ml. water and 0.5 g. of the indicated inorganic chemical and adjusted to the indicated pH with either HCl or NaOH as required. In each case the reaction mixture is heated at 250° F. for 1.5 hours and then cooled to room temperature. The pH of each reaction mixture is then adjusted to a pH of 3 with sufficient HCl where required and stirred to expel excess $H_2S$. The mixtures are allowed to age for 24 hours and then tasted to provide the results summarized below in Table 1.

TABLE 1

| Inorganic reagent | Reaction pH | | |
| --- | --- | --- | --- |
| | 3 | 7 | 12 |
| $(NH_4)_2S$ | Corn, popcorn | Nutty popcorn | Nice, slightly-charred popcorn. |
| $Na_2S$ | Firecracker, meaty, weak popcorn. | Burned meat | Freshly-popped popcorn. |
| $NH_4Cl$ | Weak, nondescript. | Weak, nondescript. | Weak, "brownish". |

Thus it can be seen that inorganic sulfides, particularly $(NH_4)_2S$, give the desired popcorn flavor and aroma over a wide pH range when reacted with either glyoxal or glycolaldehyde in accordance with the present invention, whereas an inorganic ammonium compound not containing sulfur failed to give the desired results. Moreover, it can be seen that the reaction mixture should preferably be basic during the heating step with a pH of about 12 being particularly preferred.

EXAMPLE 4

This example illustrates the effect of the organo-sulfur compound L-cysteine in place of the preferred sulfide source. A reaction mixture is prepared according to the procedure outlined in Example 2 using L-β-Mercaptoalanine (L-cysteine) as the sulfide. The reaction mixture was brought to a pH of 12 before heating. The reaction product after cooling, acidification and aging had the characteristic $H_2S$ and amine odors, not popcorn. There was also a slight chicken aroma detectable.

EXAMPLE 5

This example illustrates the unexpected nature of the discovery that glyoxal and glycolaldehyde produce, a popcorn flavor and aroma when reacted according to the process of the present invention by comparing the results achieved in Example 2 to those obtained using different but closely chemically related starting materials. The procedure of Example 2 is again repeated for each of the organic reactants listed below in Table 2 which are substituted for the glyoxal employed in Example 2. The results obtained for each of these reactants are summarized in Table 2.

TABLE 2

| Organic Reactant: | Product |
|---|---|
| Formaldehyde | Pungent |
| Acetaldehyde | Pungent, green onion |
| n-Propanal | Aldehyde |
| n-Butanal | Slight onion, fruity |
| i-Pentanal | Strong onion |
| Glyoxal | Popcorn |
| Pyruvaldehyde | Sweet, burned meat |
| Glyceraldehyde | Roasted, brown character |
| Acetone | Slight onion |
| Ethyl methyl ketone | Buttery, onion |
| Propyl methyl ketone | Cabbage, skunky |
| Pentyl methyl ketone | Bleu cheese |
| Hydroxyacetone | Sweet, brown, meaty |
| Dihydroxyacetone | Brown, meaty |
| 2,3-pentane dione | Burnt character |
| 2,4-pentane dione | Sweet, slight brown character |
| α-Keto butyric acid | Weak celery, chicken |

Thus, it can be seen that while the flavor and aroma of popcorn can be readily and economically obtained according to the present invention where the reaction mixture contains either glyoxal or glycolaldehyde, the same desirable flavor and aroma cannot be obtained using other closely chemically related starting materials.

The reaction product of the present invention is found to remain stable over extended periods of time and can be readily employed in a wide variety of food products of the type described above to desirably enhance or add to their flavor and aroma. The reaction products produced by the present invention may be employed in suitably effective amounts as needed to provide the desired taste to the food product. The natural salty flavor which is obtained in the reaction product of the present invention can either be used to add a salty flavor to the final food product or can be eliminated by techniques well known to the art.

Many obvious modifications and variations of the present invention will become apparent to those of ordinary skill in the art upon reading the above disclosure. All of these modifications and variations are intended to be included within the scope of the invention as defined by the following claims.

What is claimed is:

1. A process for producing a flavorant having the taste and aroma of popcorn which comprises:
   (a) preparing a reaction mixture comprising a compound selected from the group consisting of glyoxal and glycoaldehyde, and a sulfide source;
   (b) heating the reaction mixture at an elevated temperature to effect the reaction;
   (c) cooling the reaction mixture;
   (d) adjusting the pH of the reaction mixture to below about 7 to thereby evolve excess hydrogen sulfide; and
   (e) ageing the reaction mixture to thereby develop the characteristic pleasant popcorn flavor and aroma.

2. The process according to claim 1 wherein the pH of the reaction mixture is adjusted to above about 7 before the heating step.

3. The process according to claim 2 wherein the pH of the reaction mixture is adjusted to about 12 before the heating step.

4. The process according to claim 1 wherein the pH of the reaction mixture is adjusted to about 3 after the heating step.

5. The process according to claim 1 wherein the reaction mixture is heated for a period of about 10 minutes to 2 hours.

6. The process according to claim 1 wherein the reaction mixture is aged for a period of from at least about ½ to 2 days.

7. A flavorant produced by the process of claim 1.
8. A flavorant produced by the process of claim 2.
9. A flavorant produced by the process of claim 3.
10. A flavorant produced by the process of claim 4.

References Cited

UNITED STATES PATENTS

| 2,934,436 | 4/1960 | May et al. | 426—65 |
| 2,594,379 | 4/1952 | Barch | 426—65 |

A. LOUIS MONACELL, Primary Examiner

E. L. MASSUNG, Assistant Examiner

U.S. Cl. X.R.

426—221